United States Patent [19]

Iacconi

[11] Patent Number: 5,017,117
[45] Date of Patent: May 21, 1991

[54] EXTRUDER NOZZLE

[76] Inventor: Marie Iacconi, 29, Ch de la Miliere, Vessey Geneve, Switzerland, 30.7.1//CH-1234

[21] Appl. No.: 530,002

[22] Filed: May 29, 1990

[30] Foreign Application Priority Data

Jun. 9, 1989 [SE] Sweden .................... 89020796

[51] Int. Cl.$^5$ ............................................. B29C 47/24
[52] U.S. Cl. ........................... 425/133.1; 264/173; 425/382.3
[58] Field of Search ............... 264/167, 171, 173; 425/133.1, 382.3, 462

[56] References Cited

U.S. PATENT DOCUMENTS

| | | | |
|---|---|---|---|
| 3,540,078 | 11/1970 | Schultz | 264/167 |
| 3,649,143 | 3/1972 | Papesh et al. | 425/114 |
| 3,809,515 | 5/1974 | Farrell | 425/462 |
| 4,167,383 | 9/1979 | Murakami et al. | 425/462 |
| 4,203,715 | 5/1980 | Raley et al. | 425/131.1 |
| 4,435,241 | 3/1984 | Corbett | 264/171 |
| 4,541,793 | 9/1985 | Lindqvist | 425/206 |

OTHER PUBLICATIONS

*Mechanical Design and Systems Handbook*, 2nd Ed. Harold A. Rothbart, Editor in chief, McGraw-Hill, Inc.: U.S.A., 1985.

Primary Examiner—Jay H. Woo
Assistant Examiner—William J. Matney, Jr.
Attorney, Agent, or Firm—Lerner, David, Littenberg, Krumholz & Mentlik

[57] ABSTRACT

Nozzles for extruding annular shaped plastic products including a stationary column, a rotary head rotatably carried by the stationary column by at least one roller bearing cooperating along at least one cylindrical interface, with the stationary member including at least two supply conduits for the plastic material and the rotary head including a corresponding number of continuation flow passages so that the plastic material can be transferred from the stationary column to the rotary head at the cylindrical interface. The cylindrical interface includes a portion having a predetermined diameter so that one of the supply conduits and its corresponding continuation passage is located at a predetermined intermediate location along that portion of the cylindrical interface, and that continuation passage includes the at least one roller bearing, and the nozzle includes packing glands located on opposite sides of the roller bearing along that cylindrical interface, so as to prevent plastic material from leaking from the nozzle.

9 Claims, 2 Drawing Sheets

EXTRUDER NOZZLE

Background of the invention

When manufacturing tubular or hose-shaped products of plastics matter several problems are encountered, which depend upon the passage of the plastics matter through a nozzle, from which the matter is extruded. Homogenity and an even temperature are important.

In order to increase the strength of the product, it has been proposed to merge two or more part-flows of molten plastics matter at a common slot. Such procedure further makes it possible to use plastics of different colours and/or quality, so the product will have different colours inside and outside.

Rolling bearings in the nozzle part are subjected to high loads, but cannot be lubricated in the same manner as in conventional machines, as the grease would contaminate the plastics matter. The bearings must furthermore be located in such a manner as to prevent plastics from leaking out.

The aim of the present invention is to propose a nozzle for producing tubular or hose-shaped products, where a good control of the quality of the plastics flow is obtained, and where it is possible to locate the bearings in advantageous positions, and to provide an efficient lubrication with small risk of leakage.

SUMMARY OF THE INVENTION

The invention thus refers to an extruder nozzle connectable to at least two supply conduits for liquid plastics matter, and including a stationary member rotatably carrying a head having an extruder slot by means of at least one roller bearing, where at least two supply conduits for liquid matter are connectable to the stationary member, and is characterized by that the head by way of radial passages cooperates with continuation passages at different levels at the associated interface, that at least one rolling bearing, is located at said at least one cylindrical interface, flow of plastics matter from one of the supply conduits passing the rolling bearing and that adjustable gland packings are fitted on opposite sides of said bearing to prevent leakage of plastics matter from the nozzle.

The stationary member may be designed as a column, protruding into the head, and being provided with axial transport passages for the plastics matter. Alternatively the head may be provided with a centrally protruding trunnion, which fits into a stationary, tubular housing, the head by way of radial passages and portions of an axial passage communicating with radial continuation passages in the trunnion for cooperation with radial passages in the stationary housing. Two roller bearings are advantageous provided at different levels in connection to at least one cylindrical interface, and one of the streams of plastic matter is brought to pass both bearings.

The nozzle is preferably connectable to three supply conduits, of which the intermediate flow of plastics matter within the head is brought to pass at least one rolling bearing.

DESCRIPTION OF TWO PREFERRED EMBODIMENTS

Figure 1:
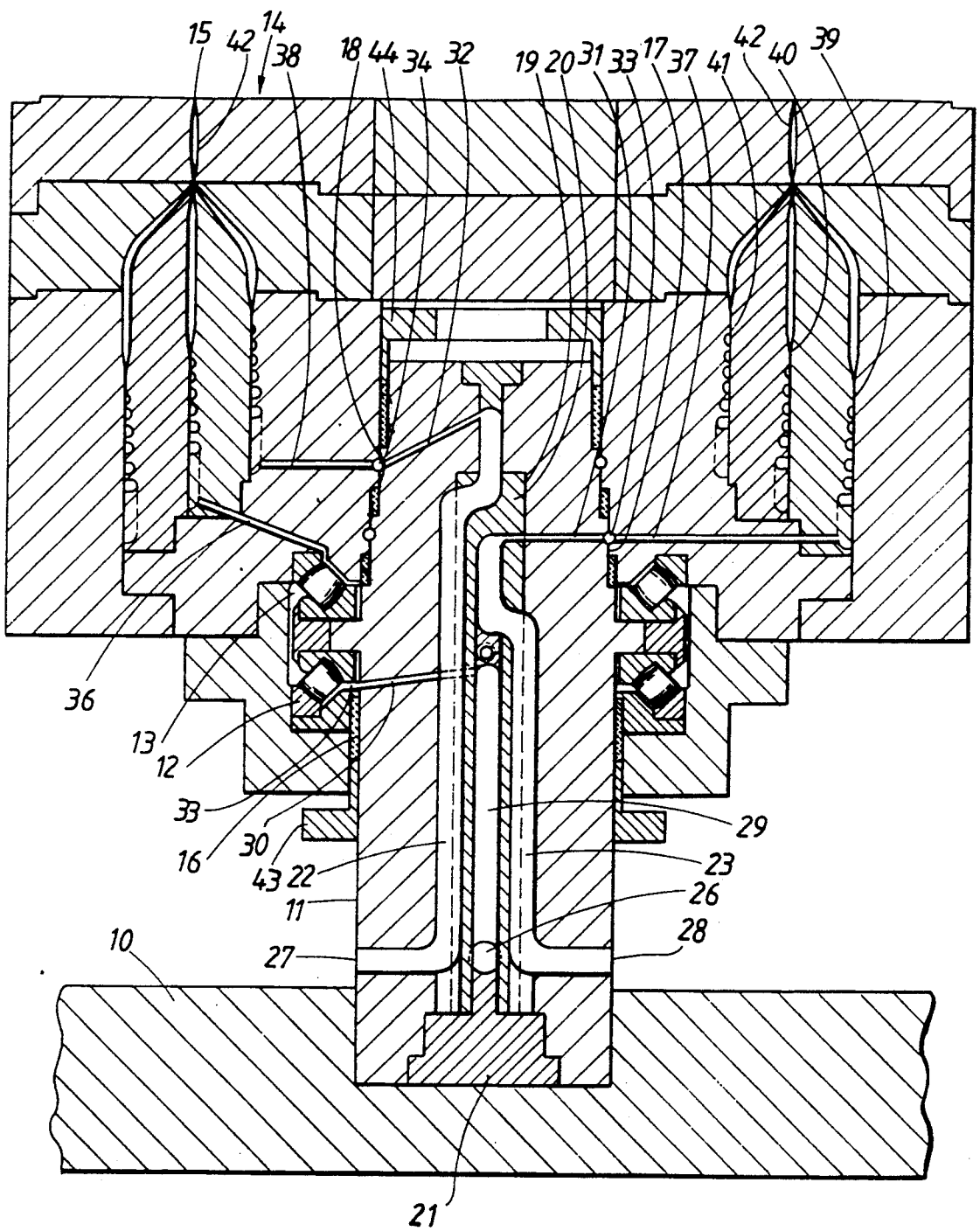
FIG. 1 shows a first embodiment of a nozzle according to the invention.

FIG. 1 shows a nozzle for producing plastics film, where a hose-shaped extrusion is blown-up to desired diameter and thereby predetermined thickness of the film.

A frame 10, not shown in detail, carries a stationary column 11, which by means of two rolling bearings carries a head, generally denoted by 14 and rotatable in relation to the column. The head is composed of annular components, which together enclose passages for a number of flows of plastics matter, and form a common, annular extrusion slot 15 for the matter.

The column 11 and the head 14 cooperate along three cylindrical surfaces 16, 17, 18 with gradually decreasing diameters in the direction outwards. A flow passage for plastics matter is located at each of these cylindrical surfaces. To locate the transfer of plastics matter from a stationary to a rotating component at a cylindrical surface brings about noticeable advantages with respect to the possibilities of decreasing leakage.

The rolling bearings 12 and 13 are mounted at the intermediate cylindrical surface 17.

The column 11 is provided with a central bore 19, in which a hollow body 20 is inserted, and locked by means of a plug 21. Mating grooves 22 and 23 in the wall to the bore 19 and in the insert body 20, will together form axial passages for two flows of plastics matter.

Liquid plastics matter is supplied by way of three conduits 26, 27, 28 to the base of the column 11. The conduit 26 communicates with a central passage 29 in the insert body 20. The conduits 27 and 28 communicate with the passages formed by the grooves 22 and 23, respectively. By arranging one half of the passage in the column and the other half in the insert body it is possible to provide accommodating radii and to polish the surfaces.

The necessary passages for compressed air and for electric current are obtained by axial bores in the column, but are not shown in the drawing.

Radial continuation passages 30, 31, 32 extend at different levels from the axial passages 22, 23, 29 each to an adjacent cylindrical interface 16, 17, 18, and at the upper of those, annular grooves 33 and 34 are formed. The rolling bearings are located at the lower cylindrical surface 16.

Radial passages 36, 37, 38 in the head communicate with the rolling bearings and the annular grooves 33, 34, respectively, and are continued by annular, axial slots 39, 40, 41 formed between annular components in the head, and merged into a common outlet 42, which communicates with the extruder slot 15.

The flow of plastics from supply conduit 26 will pass both rolling bearings 12, 13, which in this manner are efficiently lubricated, without any risk of contaminating the plastics matter. Simultaneously this flow of plastics will be subjected to an extra working, which increases the pliability thereof, and improves the melting together of the three flows of plastics, when they leave the extrusion slot 15.

The extrusion pressure is 700–800 kg/cm$^2$, and the transfer occuring at cylindrical interfaces means small clearances, and thus reasonable loads upon the packings.

Outside the transfer points between the column and the head, adjustable gland packings 43, 44 are provided, which efficiently prevent leakage of plastics from the tool. Possible minor leakage between the flows inside the head is unimportant, as the plastics matter shall be extruded through the common slot 15.

Compressed air for blowing-up the extruded hose is supplied in any suitable manner. The head is rotated in relation to the column by a mechanism of arbitrary, known type, and the head is provided with external, electric heating elements (not shown), which ensure a constant temperature of the plastics matter. It is possible to cut off the flows from either of the supply conduits 26, 27, 28. If only one flow is occasionally needed the flow through conduit 26 should be used, as this will pass the rolling bearings.

Figure 2:
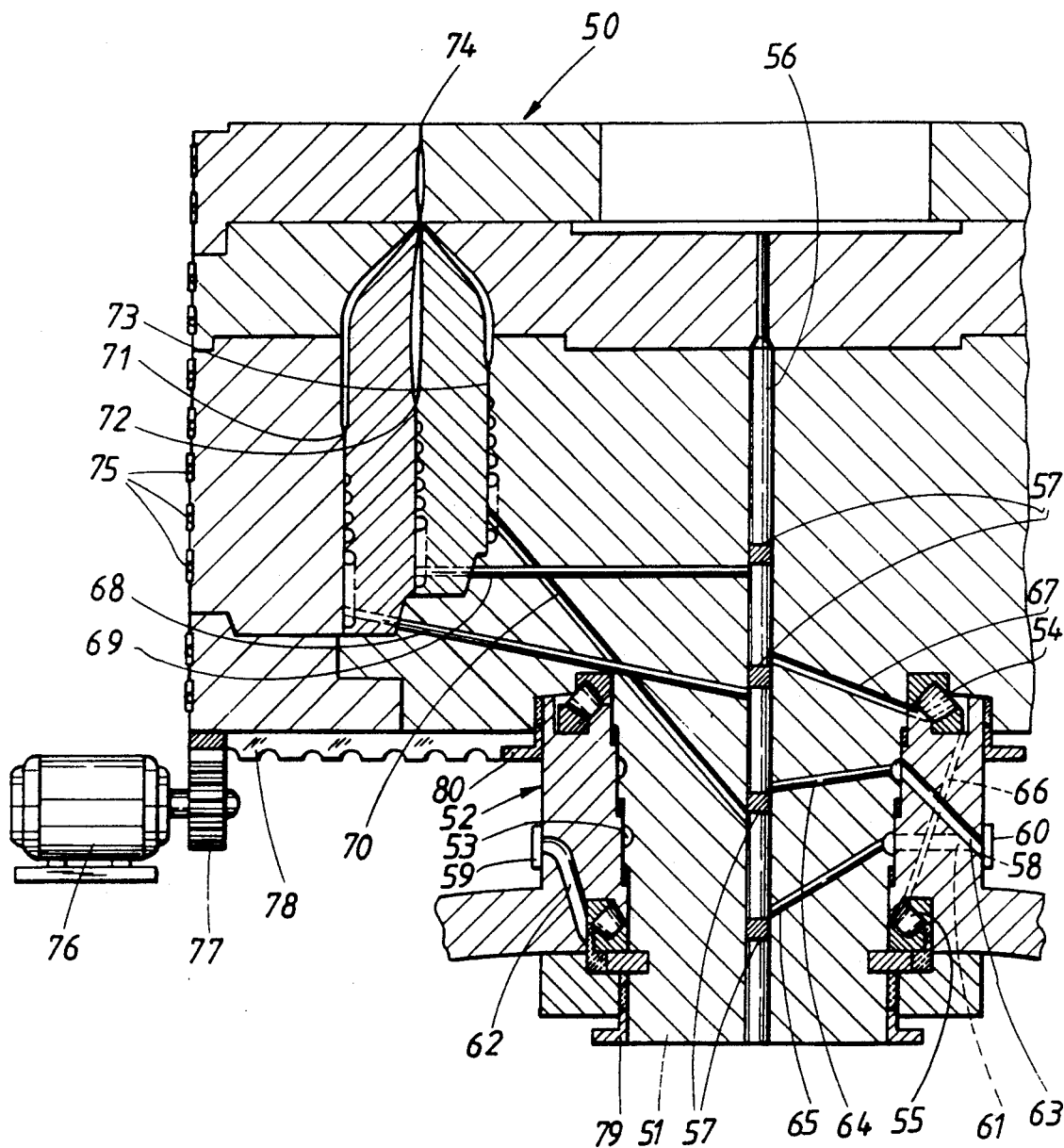
FIG. 2 shows a modified embodiment thereof.

FIG. 2 shows a portion of a nozzle according to a modified design. The head 50 is provided with a central, downwardly directed trunnion 51, which is carried in a tubular housing 52. Two separate rolling bearings 54 and 55 are located at the cylindrical interface 53 between the trunnion 51 and the housing 52.

A bore 56 extends axially through the head 50, and the trunnion 51, and is subdivided into shorter passages by means of plugs 57, located at suitable positions.

Three supply conduits 58, 59, 60 for plastics matter are connectable to the housing, and are continued by radial passages 61, 62, 63 to the cylindrical interface 53, at different levels thereof. To facilitate the fitting of packings between the radial passages the interface is slightly stepped.

Radial continuation passages 64 and 65, communicate with appropriate parts of the axial bore 56, for receiving the flows from conduits 58 and 60.

The passage 62 from supply conduit 59 extends to the lower rolling bearing 55 and a passage 66 in the housing communicates the latter with the upper rolling bearing 54. From the latter a radial continuation passage 67 leads to a defined portion of the central bore.

From the latter radial passages 68, 69, 70 at different levels extend to axial slots 71, 72, 73 formed between annular components in the head. Those slots merge into the common extrusion slot 74.

Also in this embodiment the middle flow of plastics will pass the rolling bearings 54, 55, which brings about an efficient lubrication thereof, as well as an extra working of this portion of the plastics matter.

Compressed air for blowing-up the extruded hose can be supplied in any suitable manner, not shown, and be connected to a separate passage. The head is externally provided with electric heating resistances 75, which make it possible to maintain a constant temperature in the head. This is rotated by means of an electric motor 75, which with a gear wheel 77 drives a peripheral toothed rim 78. Also here adjustable gland packings 79, 80 are provided, which efficiently prevent plastics from leaking out from the rolling bearings.

The embodiments described above and shown in the drawings should be regarded as examples of the invention only, the details of which may be varied in many ways within the scope of the appended claims.

The nozzle may be designed for only two flows of plastics, but also more than three flows are possible. The heads are shown as composed of simplified components in order to show how the plastics matter is transferred. Practical embodiments will include several details facilitating the build-up and the locking together of the components.

I claim:

1. An extruder nozzle for the extrusion of at least two streams of plastic material, said extruder nozzle comprising a stationary member, a rotary head rotatably carried by said stationary member by at least one roller bearing whereby said rotary head and said stationary member cooperatively rotate along at least one cylindrical interface, said stationary member including at least two supply conduits for each of said at least two streams of plastic material, and said rotary head including a corresponding number of continuation flow passages whereby said at least two streams of plastic material can be transferred from said stationary member to said rotary head at said at least one cylindrical interface, and said at least one cylindrical interface including a first portion having a first diameter, one of said at least two supply conduits and said corresponding one of said continuation passages associated therewith being located at an intermediate location along said first portion of said at least one cylindrical interface, said corresponding one of said continuation passages including said at least one roller bearing whereby said one of said at least two streams of plastic material passing through said one of said at least two supply conduits passes through said at least one roller bearing and packing means fitted on opposite sides of said at least one roller bearing along said at least one cylindrical interface to prevent said plastic material from leaking from said extruder nozzle.

2. The extruder nozzle of claim 1 wherein said stationary member comprises a column protruding into said rotary head, and wherein said at least one cylindrical interface includes a plurality of portions having a corresponding plurality of diameters wherein said corresponding plurality of diameters are of a different diameter than said first diameter, said plurality of portions corresponding to the number of said supply conduits.

3. The extruder nozzle of claim 2 wherein said column includes a plurality of axial transport passages corresponding to said plurality of supply conduits, each of said plurality of axial transport passages communicating with one of said plurality of portions of said at least one cylindrical interface.

4. The extruder nozzle of claim 1 wherein said at least one roller bearing comprises at least two roller bearings.

5. The extruder nozzle of claim 1 wherein said plurality of supply conduits comprises three supply conduits, and wherein said extruder nozzle includes an annular extrusion slot and three feed slots feeding said plastic material to said annular extrusion slot, said three feed slots includinng an inner feed slot, an outer feed slot and an intermediate feed slot, each of said feed slots being associated with one of said supply conduits, said intermediate feed slot being associated with said corresponding one of said continuation passages including said at least one roller bearing.

6. The extruder nozzle of claim 1 wherein said rotary head includes a centrally protruding trunnions having an axial bore, and including plug means separating said axial bore into a plurality of axial chambers, each of said plurality of axial chambers being associated with a corresponding one of said continuation passages, and said stationary member comprising an annular stationary member surrounding said trunnion with said at least one cylindrical interface therebetween.

7. The extruder nozzle of claim 6 wherein said at least one roller bearing comprises at least two roller bearings.

8. The extruder nozzle of claim 7 wherein said plurality of supply conduits comprises three supply conduits, and wherein said extruder nozzle includes an annular extrusion slot and three feed slots feeding said plastic material to said annular extrusion slot, said three feed slots including an inner feed slot, an outer feed slot, and an intermediate feed slot, each of said feed slots being associated with one of said supply conduits, said intermediate feed slot being associated with said corresponding one of said continuation passages including said at least two roller bearings.

9. The extruder nozzle of claim 6 wherein said at least one cylindrical interface includes a plurality of portions having a corresponding plurality of diameters wherein said corresponding plurality of diameters are of a different diameter than said first diameter, said plurality of portions corresponding to the number of said supply conduits.

* * * * *